US012450844B2

(12) United States Patent
Hirvonen et al.

(10) Patent No.: US 12,450,844 B2
(45) Date of Patent: Oct. 21, 2025

(54) IMAGE SIGNAL PROCESSING BASED ON OCCLUSION CULLING

(71) Applicant: Varjo Technologies Oy, Helsinki (FI)

(72) Inventors: Antti Hirvonen, Helsinki (FI); Mikko Strandborg, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 169 days.

(21) Appl. No.: 18/488,039

(22) Filed: Oct. 17, 2023

(65) Prior Publication Data

US 2025/0124667 A1    Apr. 17, 2025

(51) Int. Cl.
*G06T 19/00* (2011.01)
*G06V 10/26* (2022.01)
*H04N 9/73* (2023.01)

(52) U.S. Cl.
CPC .......... *G06T 19/006* (2013.01); *G06V 10/26* (2022.01); *H04N 9/73* (2013.01)

(58) Field of Classification Search
None
See application file for complete search history.

(56) References Cited

U.S. PATENT DOCUMENTS

| | | | | |
|---|---|---|---|---|
| 6,002,738 A * | 12/1999 | Cabral | .................. | G06T 11/006 378/4 |
| 6,990,228 B1 * | 1/2006 | Wiles | ........................ | G06T 7/55 348/42 |
| 9,265,434 B2 * | 2/2016 | Merschon | .............. | A61B 5/283 |
| 11,393,167 B2 * | 7/2022 | Cohen | ..................... | G06T 15/00 |
| 11,651,547 B2 * | 5/2023 | Panteleev | ............... | G06T 7/248 345/426 |
| 2004/0125103 A1 * | 7/2004 | Kaufman | ................ | G06T 15/08 345/419 |
| 2012/0081357 A1 * | 4/2012 | Habbecke | ............... | G06T 17/20 345/419 |

(Continued)

FOREIGN PATENT DOCUMENTS

WO    2023126560 A1    7/2023

OTHER PUBLICATIONS

European Patent Office, Extended European Search Report, Application No. 24201616.0, Mailed Mar. 14, 2025, 12 pages.

(Continued)

*Primary Examiner* — Martin Mushambo
(74) *Attorney, Agent, or Firm* — ZIEGLER IP LAW GROUP, LLC.

(57) ABSTRACT

Disclosed is a system comprising data repository(ies) and server(s) configured to: access, from data repository(ies), a first three-dimensional (3D) model of a virtual environment and a second 3D model of a real-world environment; combine the first 3D model and the second 3D model to generate a combined 3D model of an extended-reality (XR) environment; perform occlusion culling using the combined 3D model, to identify a set of virtual objects that occlude real object(s) in the XR environment from a perspective of a viewpoint; and send, to display apparatus(es), a virtual-reality (VR) image representing the set of virtual objects and information indicative of portion(s) of a field of view that corresponds to the real object(s) that is being occluded by the set of virtual objects from the perspective of the viewpoint.

10 Claims, 4 Drawing Sheets

(56) References Cited

U.S. PATENT DOCUMENTS

| | | | | |
|---|---|---|---|---|
| 2012/0212496 A1* | 8/2012 | Kulla | ............... | G06T 15/506 |
| | | | | 345/501 |
| 2014/0267268 A1* | 9/2014 | Tipton | ............... | G06T 19/20 |
| | | | | 345/424 |
| 2015/0063717 A1* | 3/2015 | Pavani | ............... | H04N 5/57 |
| | | | | 382/261 |
| 2019/0051052 A1* | 2/2019 | Corazza | ............... | G06T 15/60 |
| 2019/0108639 A1* | 4/2019 | Tchapmi | ............... | G06N 3/044 |
| 2019/0278293 A1* | 9/2019 | Levinson | ............... | G06T 17/20 |
| 2019/0295313 A1 | 9/2019 | Davies et al. | | |
| 2019/0325639 A1* | 10/2019 | White | ............... | G06T 15/405 |
| 2021/0142497 A1 | 5/2021 | Pugh et al. | | |
| 2021/0304483 A1* | 9/2021 | Garvey | ............... | G06T 7/529 |

OTHER PUBLICATIONS

Hildalgo et al, "Hybrid Geometric- Image Based Rendering", Chapter 1: Monte Carlo Path Tracing, vol. 21, No. 3, pp. 471-482, XP071486788, DOI: 10.1111/1467-8659.00607, 12 pages.

* cited by examiner

IMAGE SIGNAL PROCESSING BASED ON OCCLUSION CULLING

TECHNICAL FIELD

The present disclosure relates to systems incorporating image signal processing based on occlusion culling. The present disclosure also relates to display apparatuses incorporating image signal processing based on occlusion culling. The present disclosure further relates to methods incorporating image signal processing based on occlusion culling.

BACKGROUND

Generally, extended-reality (XR) images are generated by intermixing virtual-reality (VR) content with real-world content. The VR content is entirely computer generated, while the real-world content is captured using a camera. For generating an XR image, the VR content is superimposed on the real-world content in a manner that the VR content appears to be well-blended (i.e., realistically combined) with the real-world content.

Existing image rendering technologies often employ occlusion culling techniques (for example, such as Potentially Visible Set (PVS)-based occlusion culling technique) to determine which virtual objects (or their parts) present in an XR environment are highly likely to be visible from a perspective of a current pose of the camera, and thus information pertaining to only those virtual objects is communicated to a processor for compositing purposes. However, since there is a likelihood that at least some of those virtual objects would be represented in a final XR image, and would occlude some real objects (or their parts) present in an XR environment, image data of pixels corresponding to such real objects is still read out by an image sensor of the camera, even when said real objects are not going to be visible in the final XR image; and said image data is then processed by the processor. This is highly time consuming and computationally intensive.

Therefore, in light of the foregoing discussion, there exists a need to overcome the aforementioned drawbacks.

SUMMARY

The present disclosure seeks to provide systems, a display apparatus, and a method for facilitating in generating extended-reality (XR) images, in a computationally-efficient manner and a time-efficient manner. The aim of the present disclosure is achieved by systems, a display apparatus, and a method for incorporating image signal processing based on occlusion culling, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
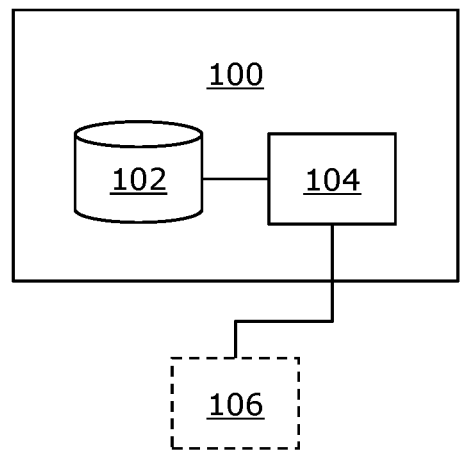
FIG. 1 illustrates a block diagram of an architecture of a system incorporating image signal processing based on occlusion culling, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one data repository and at least one server configured to:
 access, from the at least one data repository, a first three-dimensional (3D) model of a virtual environment and a second 3D model of a real-world environment;
 combine the first 3D model and the second 3D model to generate a combined 3D model of an extended-reality (XR) environment;
 perform occlusion culling using the combined 3D model, to identify a set of virtual objects that occlude at least one real object in the XR environment from a perspective of a given viewpoint; and
 send, to at least one display apparatus, a virtual-reality (VR) image representing the set of virtual objects and information indicative of at least one portion of a field of view that corresponds to the at least one real object that is being occluded by the set of virtual objects from the perspective of the given viewpoint.

In a second aspect, an embodiment of the present disclosure provides a system comprising at least one data repository and at least one server configured to:
 obtain a real-world depth map of a real-world environment from a perspective of a given viewpoint;
 divide the real-world depth map into a plurality of tiles;
 for a given tile, determine a three-dimensional (3D) bounding volume comprising non-empty 3D points;
 access, from the at least one data repository, a 3D model of a virtual environment;
 perform occlusion culling on corresponding 3D bounding volumes of the plurality of tiles, by employing at least one of: the 3D model of the virtual environment, a virtual-reality (VR) depth map generated using the 3D model, to determine a set of virtual objects that occlude at least one real object in an extended-realty (XR) environment from a perspective of a given viewpoint and one or more of the plurality of tiles whose 3D bounding volumes are being fully occluded by the set of virtual objects from the perspective of the given viewpoint; and send, to at least one display apparatus, a VR image representing the set of virtual objects and information indicative of the one or more of the plurality of tiles whose 3D bounding volumes are being fully occluded by the set of virtual objects from the perspective of the given viewpoint.

In a third aspect, an embodiment of the present disclosure provides a display apparatus comprising:

an image sensor per eye, comprising a plurality of pixels arranged on a photo-sensitive surface thereof, the image sensor being employed to capture images of a real-world environment; and at least one processor configured to:

receive, from at least one server, a virtual-reality (VR) image representing a set of virtual objects and information indicative of at least one of:

(a) at least one portion of a field of view of the image sensor that corresponds to at least one real object that is being occluded by the set of virtual objects in an extended-reality (XR) environment from a perspective of a given viewpoint, (b) one or more of a plurality of tiles of a real-world depth map whose three-dimensional (3D) bounding volumes are being fully occluded by the set of virtual objects from the perspective of the given viewpoint;

determine at least one region of the photo-sensitive surface that corresponds to the at least one of:

(a) the at least one portion of the field of view of the image sensor, (b) the one or more of the plurality of tiles of the real-world depth map;

capture an image using the image sensor, by performing at least one of:

(i) skipping read out of pixel data from the at least one region of the photo-sensitive surface, (ii) controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image; and utilise the VR image and the captured image, to generate an XR image.

In a fourth aspect, an embodiment of the present disclosure provides a method comprising:

receiving, from at least one server, a virtual-reality (VR) image representing a set of virtual objects and information indicative of at least one of:

(a) at least one portion of a field of view of an image sensor that corresponds to at least one real object that is being occluded by the set of virtual objects in an extended-reality (XR) environment from a perspective of a given viewpoint, (b) one or more of a plurality of tiles of a real-world depth map whose three-dimensional (3D) bounding volumes are being fully occluded by the set of virtual objects from the perspective of the given viewpoint, wherein the image sensor comprises a plurality of pixels arranged on a photo-sensitive surface thereof, the image sensor being employed to capture images of a real-world environment;

determining, by at least one processor, at least one region of the photo-sensitive surface that corresponds to the at least one of:

(a) the at least one portion of the field of view of the image sensor, (b) the one or more of the plurality of tiles of the real-world depth map;

capturing an image using the image sensor, by performing at least one of:

(i) skipping read out of pixel data from the at least one region of the photo-sensitive surface, (ii) controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image; and utilising, at the at least one processor, the VR image and the captured image, to generate an XR image.

The present disclosure provides the aforementioned systems, the aforementioned display apparatus, and the aforementioned method incorporating image signal processing based on occlusion culling, to facilitate in generating highly accurate and realistic XR images, in computationally-efficient and time-efficient manner. Herein, according to the aforementioned first aspect, the VR image is sent to the at least one display apparatus, along with the information indicative of the at least one portion of the field of view; and according to the aforementioned second aspect, the VR image is sent to the at least one display apparatus, along with the information indicative of the one or more of the plurality of tiles. The VR image represents the virtual objects in the identified set that are not occluded by any other virtual object or by the at least one real object. Since the at least one real object would not be visible from the perspective of the given viewpoint (and would not be represented in the image), image signals corresponding to the at least one real object are not captured by pixels in the at least one region of the photo-sensitive surface. Therefore, pixel data of pixels in the at least one region is not read out (namely, is skipped) by the image sensor, and therefore, image signal processing for the at least one region is entirely omitted. This beneficially facilitates in saving processing resources and processing time of the at least one processor, instead image signal processing for those real objects or their portions (lying in the remaining/non-occluded portion of the field of view of the image sensor) that would highly likely be visible from the perspective of the given viewpoint would be accommodated in an improved manner by controlling the at least one parameter accordingly. In this way, the XR image is generated highly realistically, and is generated without any overburdening, delays, and excessive power consumption of the at least one processor. The systems, the display apparatus, and the method are simple, robust, fast, reliable, and can be implemented with ease.

It will be appreciated that the aforementioned first aspect and the aforementioned second aspect cover a first implementation of the system and a second implementation of the system, respectively. The display apparatus of the aforementioned third aspect is susceptible to utilise any of the first implementation and the second implementation.

There will now be provided details of various operations as described earlier with respect to the aforementioned first aspect.

Notably, the at least one server controls an overall operation of the system. In some implementations, the at least one server is implemented as a remote server. For example, the remote server could be a cloud server that provides a cloud computing service. In other implementations, the at least one server is implemented as a processor of a computing device. Examples of the computing device include, but are not limited to, a laptop, a desktop, a tablet, a phablet, a personal digital assistant, a workstation, and a console.

It will be appreciated that the at least one server is communicably coupled to the at least one data repository and the at least one display apparatus. The at least one data repository could be implemented, for example, such as a memory of the at least one server, a memory of the computing device, a memory of the at least one display apparatus, a removable memory, a cloud-based database, or similar.

Throughout the present disclosure, the term "display apparatus" refers specialized equipment that is capable of at least generating (and optionally, displaying) XR images. Optionally, the display apparatus is implemented as a head-mounted display (HMD) device. The term "head-mounted display device" refers to specialized equipment that is configured to present an XR environment to a user when the HMD device, in operation, is worn by the user on his/her head. The HMD device is implemented, for example, such as an XR headset, a pair of XR glasses, and the like, that is operable to display a visual scene of the XR environment to the user. The term "extended-reality" encompasses virtual reality (VR), augmented reality (AR), mixed reality (MR), and the like. It will be appreciated that the at least one display apparatus (or a user of the at least one display apparatus) and the system could be present in different real-world environments (namely, different geographical locations). In this regard, in a multi-user scenario, different multiple display apparatuses could be served by the system simultaneously, when these display apparatuses are communicably coupled to the system, for example, via a communication network.

Accessing First 3D Model And Second 3D Model

Throughout the present disclosure, the term "first three-dimensional model" of the virtual environment refers to a data structure that comprises comprehensive information pertaining to virtual objects or their parts present in the virtual environment (namely, a computer-generated environment). Such comprehensive information is indicative of at least one of: surfaces of the virtual objects or their parts, a plurality of features of the virtual objects or their parts, shapes and sizes of the virtual objects or their parts, poses of the virtual objects or their parts, colour information of the virtual objects or their parts, depth information of the virtual objects or their parts. Examples of the plurality of features include, but are not limited to, edges, corners, blobs, high-frequency features, low-frequency features, and ridges. The term "pose" encompasses a position and/or an orientation.

Throughout the present disclosure, the term "virtual object" refers to a computer-generated object (namely, a digital object). Examples of the virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and a virtual information (such as a virtual news description, a virtual announcement, virtual data, and so forth).

Throughout the present disclosure, the term "second three-dimensional model" of the real-world environment refers to a data structure that comprises comprehensive information pertaining to real objects or their parts present in the real-world environment (namely, a physical environment). Such comprehensive information is indicative of at least one of: surfaces of the real objects or their parts, a plurality of features of the real objects or their parts, shapes and sizes of the real objects or their parts, poses of the real objects or their parts, materials of the real objects or their parts, colour information of the real objects or their parts, depth information of the real objects or their parts.

Throughout the present disclosure, the term "real object" refers to a physical object or its part present in the real-world environment. A real object could be a living object (for example, such as a human, a pet, a plant, and the like) or a non-living object (for example, such as a wall, a building, a shop, a road, a window, a toy, a poster, a lamp, and the like).

Optionally, a given 3D model is in a form of at least one of: a 3D polygonal mesh, a 3D point cloud, a 3D surface cloud, a 3D surflet cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the given 3D model are well-known in the art. The term "given 3D model" encompasses the first 3D model and/or the second 3D model.

Optionally, prior to accessing the first 3D model and the second 3D model, the at least one server is configured to generate both the first 3D model and the second 3D model, and store both the first 3D model and the second 3D model at the at least one data repository. It will be appreciated that since the virtual environment is entirely a computer-generated environment (in which no real-world content is present, and only computer-generated objects are present), the at least one server can easily and accurately generate the first 3D model, for example, based on a VR software application or a VR video. Techniques and/or algorithms for generating a 3D model of a virtual environment is well-known in the art. On the other hand, the at least one server is optionally configured to generate the second 3D model (of the real-world environment) from a plurality of visible-light images and a plurality of depth images (corresponding to the plurality of visible-light images), based on corresponding poses from perspectives of which the plurality of visible-light images and the plurality of depth images are captured. Optionally, in this regard, the at least one server is configured to employ at least one first data processing algorithm for processing the plurality of visible-light images and the plurality of depth images to generate the second 3D model. Optionally, the at least one first data processing algorithm comprises at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. It will be appreciated that the first 3D model and/or the second 3D model could be generated prior to or at a start of a given session of using the system (or using the at least one display apparatus). Optionally, the first 3D model and the second 3D model are generated in a (same) global coordinate space. The term "global coordinate space" refers to a 3D space that is represented by a global coordinate system (for example, such as a Cartesian coordinate system).

It will be appreciated that the plurality of visible-light images, the plurality of depth images, and information pertaining to the corresponding poses could be received by the at least one server from any of:
- the at least one display apparatus comprising tracking means and at least one camera that is implemented as a combination of a visible-light camera and a depth camera, or
- the at least one data repository whereat the plurality of colour images, the plurality of depth maps, and said information are pre-stored.

The tracking means could be implemented as at least one of: an optics-based tracking system, an acoustics-based tracking system, a radio-based tracking system, a magnetism-based tracking system, an accelerometer, a gyroscope, an Inertial Measurement Unit (IMU), a Timing and Inertial Measurement Unit (TIMU).

Generation of Combined 3D Model

Throughout the present disclosure, the term "combined 3D model" of the XR environment refers to a data structure that comprises comprehensive information pertaining to virtual objects or their parts as well as real objects or their parts present in the XR environment, said data structure is obtained upon combining the first 3D model and the second 3D model.

Optionally, when combining the first 3D model and the second 3D model, the at least one server takes into account at least one of: information pertaining to coordinate spaces in which the first 3D model and the second 3D model are generated for scaling and aligning the aforesaid models properly, information pertaining to optical depths of virtual objects and real objects, information pertaining to relative poses of the virtual objects and the real objects with respect to each other for a seamless and visually-consistent combination of the first 3D model and the second 3D model, information pertaining to lighting in the first 3D model and the second 3D model. Beneficially, the combined 3D model generated in this manner would be very accurate (for example, in terms of employing it for performing the occlusion culling as discussed hereinbelow), highly realistic and coherent, and information-rich. Techniques and/or algorithms for facilitating combining a 3D virtual environment model and a 3D real-world environment model are well-known in the art.

Performing Occlusion Culling

Throughout the present disclosure, the term "occlusion culling" refers to a process for at least identifying which virtual object(s) that lie within a viewing frustum that is apexed at the given viewpoint occlude (namely, obscure) which real objects (or their portions) that lie within the same viewing frustum. Such virtual object(s) is/are then included in the set of virtual objects that occlude the at least one real object in the XR environment. Herein, the term "viewing frustum" refers to a frustum-shaped viewing region within the XR environment from the perspective of the given viewpoint. The occlusion culling is well-known in the art.

The set of virtual objects may include a single virtual object or multiple virtual objects, depending on the visual scene of the XR environment. It will be appreciated that there may be some virtual object and/or some real object that being present within the viewing frustum, would still not be visible from the perspective of the given viewpoint, due to being occluded by any other virtual object or by any other real object. Thus, these occluded virtual object and/or real object would not be considered for rendering purposes. Pursuant to embodiments of the present disclosure, the virtual objects in the identified set are those virtual objects that are not occluded by any other virtual object or by any other real object. In other words, the virtual objects in the identified set would highly likely be visible from the perspective of the given viewpoint being present within the viewing frustum.

It will be appreciated that since pose information and depth information of the real objects and the virtual objects is available to the at least one server from the combined 3D model, information pertaining to placements (both absolute placements and relative placements), geometries, occlusions, and the like, of the real objects and the virtual objects can be accurately known to the at least one server in great detail from perspectives of various viewpoints. Therefore, the at least one server can easily and accurately perform the occlusion culling to identify the set of virtual objects. It will also be appreciated that the occlusion culling could be implemented using a potentially visible set (PVS)-based occlusion culling technique, a hierarchical visibility-based occlusion culling technique, hierarchical occlusion map (HOM)-based occlusion culling technique, occluder fusion-based occlusion culling technique, and the like. The aforesaid occlusion culling techniques are well-known in the art.

Throughout the present disclosure, the term "viewpoint" encompasses both a viewing position at which an image sensor (or a camera comprising the image sensor) of the at least one display apparatus is positioned in the real-world environment as well as a viewing direction in which the image sensor has to capture an image (as discussed later). It is to be understood that a viewpoint within the XR environment from a perspective of which the set of virtual objects is identified and a viewpoint from a perspective of which the image is to be captured by said image sensor are same.

Sending VR Image and Information

The VR image is sent to the at least one display apparatus in real time or near-real time, for enabling generation of an XR image (as discussed later). Optionally, the at least one server is configured to generate the VR image by utilising the first 3D model, the VR image represents the virtual objects of the identified set. Optionally, in this regard, the at least one server is configured to employ at least one second data processing algorithm that enables in transforming a 3D point in the first 3D model to a 2D point in the VR image, from the perspective of the given viewpoint. Optionally, the at least one second data processing algorithm is at least one of: an image synthesis algorithm (such as an RGB-D image synthesis algorithm), a view synthesis algorithm, a rendering algorithm. Such data processing algorithms are well-known in the art.

In addition to this, the information indicative of the at least one portion of the field of view (of the image sensor) is also sent to the at least one display apparatus in real time or near-real time. It will be appreciated that multiple real objects or their portions present in the real-world environment span across a field of view of the image sensor; therefore, for the image that is to be captured from the given viewpoint, light reflecting off these real objects or their portions is incident upon the image sensor at different incident angles. As an example, when an angular width of a horizontal field of view of the image sensor is 90 degrees, these real objects or their portions are captured in the image such that information pertaining to the real objects or their portions is captured from −45 degrees to +45 degrees from a centre of the horizontal field of view. Thus, the given viewpoint from a perspective of which a given real object or its portion is captured by the image sensor not only depends on the viewing position and the viewing direction of the image sensor, but also depends on which portion of the field of view of the image sensor would the given object or its portion be captured. Optionally, the information indicative of the at least one portion of the field of view comprises an angular width of the at least one portion of the field of view.

Pursuant to embodiments of the present disclosure, since the at least one real object would not be visible from the perspective of the given viewpoint (and would not be represented in the image) as it is being occluded by the set of virtual objects, image signals corresponding to the at least one real object need not be captured by at least some pixels of the image sensor that corresponds to the at least one portion of the field of view of the image sensor. Therefore, the aforesaid information is sent to the at least one display apparatus in order to control the image sensor accordingly, when capturing the image. This will be discussed later in detail when various operations with respect to the aforementioned third aspect will be described. It will be appreciated that the aforesaid scenario is particularly true for a case when a given virtual object in the identified set is an opaque virtual object. In a case when a given virtual object may be a transparent virtual object or a translucent virtual object, a real object or its portion that is occluded by the transparent virtual object or the translucent virtual object would then be visible from the perspective of the given viewpoint. Thus, said real object or its portion would be considered for rendering purposes.

There will now be provided details of various operations as described earlier with respect to the aforementioned second aspect. It is to be understood that some common details of the aforementioned second aspect have already been described earlier with respect to the aforementioned first aspect, and need not be described again, for sake of brevity and avoiding repetition.

Obtaining Real-World Depth Map

Throughout the present disclosure, the term "real-world depth map" refers to a data structure comprising information pertaining to optical depths of real objects or their portions present in the real-world environment. In other words, the depth map provides information pertaining to distances (namely, the optical depths) of surfaces of the real objects or their portions, from the perspective of the given viewpoint. Optionally, the depth map is in form of a depth image comprising a plurality of pixels, wherein a pixel value of each pixel indicates an optical depth of its corresponding real-world point/region within the real-world environment. It will be appreciated that the real-world depth map may also represent visual content of the real-world environment, in addition to the optical depths of the real objects.

Optionally, when obtaining the real-world depth map, the at least one server is configured to generate said real-world depth map by at least one of:
  reprojecting a previous real-world depth map that was previously received from the at least one display apparatus,
  using a 3D model of the real-world environment that is pre-generated, based on a plurality of visible-light images, a plurality of depth images (corresponding to the plurality of visible-light images), and corresponding poses from perspectives of which the plurality of visible-light images and the plurality of depth images are captured, and pre-stored at the at least one data repository.

In this regard, the previous real-world depth map may correspond to a different viewpoint as compared to the given viewpoint; therefore, the previous real-world depth map needs to be reprojected accordingly, in order to match a perspective of the different viewpoint with the perspective of the given viewpoint, to generate the (reprojected) real-world depth map. Reprojection techniques and/or algorithms are well-known in the art. Further, optionally, when using the 3D model of the real-world environment for generating the real-world depth map, the at least one server is configured to employ the at least one second data processing algorithm, in a similar manner as discussed earlier.

Division of Real-World Depth Map Into Tiles

Throughout the present disclosure, the term "tile" of the real-world depth map refers to a segment of the real-world depth map. It will be appreciated that a given tile of the real-world depth map has a defined shape and/or size. In an example, a size of the given tile may be 32×32 pixels or may be 50×100 pixels. Optionally, when dividing the real-world depth map, the at least one server is configured to employ at least image processing algorithm. Optionally, the at least image processing algorithm is at least one of: an image slicing algorithm, an image cropping algorithm, an image segmentation algorithm.

Determination of 3D Bounding Volume

Throughout the present disclosure, the term "bounding volume" refers to an imaginary closed volume that encloses a set of real objects present within a 3D space of the real-world environment. The bounding volume may, for example, be in form of a bounding box. Examples of the bounding box may include, but are not limited to, an oriented bounding box (OBB), an axis-aligned bounding box (AABB), a discrete oriented polytope (DOP). The technical benefit of determining the 3D bounding volume is that (objects or their portions present in) the 3D space of the real-world environment can be represented in a highly space-efficient manner. The bounding volume and the bounding box are well-known in the art.

It will be appreciated that when the 3D model of the real-world environment is in form of a bounding volume hierarchy (BVH) model, for the given tile, the at least one server may utilise the real-world depth map in order to ascertain which 3D points in the 3D model corresponding to the given tile are empty and non-empty, from the perspective of the given viewpoint. This may be because of the fact that an empty or unoccupied space in the 3D space of the real-world environment have invalid/no optical depth in the real-world depth map. Thus, the at least one server can easily and accurately determine the 3D bounding volumes of the plurality of tiles. The phrase "3D bounding volume comprising non-empty 3D points" mean that to a 3D bounding volume that has a real object (or its portion) present therein. Therefore, a density inside said 3D bounding volume would be non-zero, and values of optical depths corresponding to said non-empty 3D points would be valid/realistic.

Accessing 3D Model of Virtual Environment

It will be appreciated that the 3D model of the virtual environment is accessed from the at least one data repository in real time or near-real time. Information pertaining to the 3D model of the virtual environment has already been described earlier with respect to the aforementioned first aspect.

Performing Occlusion Culling

Optionally, when performing the occlusion culling by employing the 3D model of the virtual environment, the at least one server is configured to digitally overlay the 3D model of the virtual environment on the corresponding 3D bounding volumes from the perspective of the given viewpoint, in order to determine which bounding volumes are being occluded by which virtual objects and thus are not visible from the perspective of the given viewpoint. Additionally, or alternatively, optionally, when performing the occlusion culling by employing the VR depth map, the at least one server is configured to compare an optical depth of a given VR object from the VR depth map with an optical depth of a given bounding volume, in order to determine which one of the given VR object and the given bounding volume occludes another of the given VR object and the given bounding volume. The bounding volumes which are determined to be occluded by some virtual object(s) would comprise the at least one real object that are likely to be not visible from the perspective of the given viewpoint. Similarly, such virtual object(s) is/are determined to be included in the set of virtual objects that occlude the at least one real object in the XR environment. Moreover, since the 3D bounding volumes are already associated with (namely, linked to) the plurality of tiles, the at least one server can accurate determine the one or more of the plurality of tiles whose 3D bounding volumes are identified to be fully occluded.

It will be appreciated that since the corresponding bounding volumes are determined by the at least one server itself, their optical depths are readily available to the at least one server. Throughout the present disclosure, the term "virtual-reality depth map" refers to a data structure comprising information pertaining to optical depths of virtual objects or their portions present in the virtual environment. In other words, the VR depth map provides information pertaining to distances (namely, the optical depths) of surfaces of the virtual objects or their portions, from the perspective of the given viewpoint. Optionally, the VR depth map is in form of a VR depth image. Optionally, when using the 3D model of the virtual environment for generating the VR depth map, the at least one server is configured to employ the at least one second data processing algorithm, in a similar manner as discussed earlier with respect to the aforementioned first aspect.

Sending VR Image and Information

The VR image is sent to the at least one display apparatus in real time or near-real time, for enabling generation of an XR image (as discussed later). The VR image is generated using the 3D model of the virtual environment, in a similar manner as described earlier with respect to the aforementioned first aspect. In addition to this, the information indicative of the one or more of the plurality of tiles is also sent to the at least one display apparatus in real time or near-real time. It will be appreciated that since the at least one real object would not be visible from the perspective of the given viewpoint (and would not be represented in an image to be captured by an image sensor of the at least one display apparatus, as discussed earlier), image signals corresponding to the at least one real object need not be captured by at least some pixels of the image sensor that corresponds to at least one portion of a field of view of the image sensor. Therefore, the aforesaid information is sent to the at least one display apparatus in order to utilise it to determine the at least one portion of the field of view, and then to control the image sensor accordingly when capturing the image. This will be discussed later in detail when various operations with respect to the aforementioned third aspect will be described.

Optionally, the information indicative of the one or more of the plurality of tiles comprises any one of:
- position coordinates of at least one of four corners of the given tile,
- a row number and a column number of the given tile,
- position coordinates and dimensions in an atlas image, when the plurality of tiles are packed into said atlas image.

As an example, when the plurality of tiles are equi-sized, position coordinates of only one corner, for example, a upper-left corner of the given tile may be included in said information.

According to any of the aforementioned first aspect and the aforementioned second aspect, optionally, said information is sent to the at least one display apparatus prior to sending the VR image. The technical benefit of sending said information prior to sending to the VR image is that said information could be beneficially utilised at a time of capturing the image using the image sensor and read out of pixel data and processing of image signals can be accordingly skipped for at least some pixels of the image sensor that corresponds to the at least one portion of the field of view. On the other hand, the VR image is only needed at the at least one display apparatus at a time of compositing (namely, composing or generating) the XR image using the VR image and the image captured using the image sensor to be displayed at the at least one display apparatus. In this way, an image processing pipeline at the at least one display apparatus could be retained entirely in sync, without any need for it to perform any unnecessary additional reprojections on read out pixel data. It will be appreciated that said information is sent to the at least one display apparatus in a bandwidth-efficient and time-efficient manner (with minimal latency/delay) due to its compact size.

There will now be provided details of various operations as described earlier with respect to the aforementioned third aspect. It is to be understood that some common details of the aforementioned third aspect have already been described earlier with respect to the aforementioned first aspect and the aforementioned second aspect, and need not be described again, for sake of brevity and avoiding repetition.

Throughout the present disclosure, the term "image sensor" refers to a device that detects light from the real-world environment at its photosensitive surface, thereby enabling the plurality of pixels arranged on the photosensitive surface to capture a plurality of image signals. The plurality of image signals are electrical signals pertaining to a real-world scene of the real-world environment. The plurality of image signals constitute pixel data of the plurality of pixels. Herein, the term "pixel data" refers to information pertaining to a given pixel arranged on the photosensitive surface, wherein said information comprises one or more of: a colour value of the given pixel, a depth value of the given pixel, a transparency value of the given pixel, a luminance value of the given pixel. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. In an example, the image sensor may comprise 25 megapixels arranged in a rectangular two-dimensional (2D) grid (such as a 5000×5000 grid) on the photosensitive surface. Image sensors are well-known in the art.

Optionally, the image sensor is a part of a camera that is employed to capture the images. Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. Optionally, the camera is implemented as a combination of the visible-light camera and the depth camera. Optionally, the camera comprises at least one of: a Bayer colour filter array (CFA), a multispectral filter, arranged in front of the plurality of pixels. The Bayer CFA and the multispectral filter are well-known in the art.

It will be appreciated that when capturing the images, it is ensured that either the camera (or the image sensor) is capturing images of a static real-world environment (i.e., only stationary objects are present in the real-world environment), or a change in a relative pose between the camera and a given object or its part present in the real-world environment is minimal/negligible. In this way, the at least one region of the photo-sensitive surface is determined accurately, and thus it would be advantageous to skip read out of the pixel data from the at least one region.

Notably, the at least one processor controls an overall operation of the at least one display apparatus. The at least one processor is communicably coupled to at least the image sensor. Optionally, the at least one processor is implemented as an image signal processor. In an example, the image signal processor may be a programmable digital signal processor (DSP).

Receiving VR Image and Information

It will be appreciated that the VR image and information indicative of at least one of: the at least one portion of the field of view, one or more of a plurality of tiles, are received from the at least one server in real time or near-real time. The VR image would be utilised by the at least one processor along with the captured image, to generate the XR image, while said information is utilised by the at least one processor to determine the at least one region of the photo-sensitive surface for which read out of pixel data need to be skipped when capturing the image, as discussed hereinbelow.

Determination of Region(s) of Photo-Sensitive Surface

Optionally, when determining the at least one region of the photo-sensitive surface using (a), the at least one processor is configured to map the at least one portion of the field of view onto the photo-sensitive surface. Additionally or alternatively, optionally, when determining the at least one region of the photo-sensitive surface using (b), the at least one processor is configured to map individual fields of view of the one or more of the plurality of tiles onto the field of view of the image sensor to determine (a), wherein said individual fields of view are already accurately known to the at least one processor from said information. In an example, in a scenario when there are more than one portion of the field of view, some tiles from amongst the one or more of the plurality of tiles may correspond to one portion of the field of view, while other remaining tiles may correspond to another portion of the field of view. Once (a) is deduced from (b), the at least one region can be easily determined.

Capturing Image

Throughout the present disclosure, the term "image" refers to a visual representation of the real-world environment. The term "visual representation" encompasses colour information represented in the image, and additionally optionally other attributes associated with the image (for example, such as depth information, luminance information, transparency information (namely, alpha values), polarisation information, and the like).

Notably, once the at least one region of the photo-sensitive surface is determined, pixel data of pixels in the at least one region is not read out (namely, is skipped) by the image sensor, and therefore, image signal processing for the at least one region is entirely omitted. This is beneficial because the at least one real object would not be visible from the perspective of the given viewpoint (and would not be represented in the image) as it is being occluded by the set of virtual objects. In such a case, image signals corresponding to the at least one real object need not be captured by pixels in the at least one region. This beneficially facilitates in saving processing resources and processing time of the at least one processor, which otherwise would have been wasted by reading out (and processing) said pixel data.

In addition to this, since some real objects or their portions would highly likely be visible from the perspective of the given viewpoint (and would be represented in the image) as they not being occluded by the set of virtual objects, the at least one processor is configured to read out pixel data from the remaining region of the photo-sensitive surface. Thus, the image signal processing could be accommodated in an improved manner (by controlling the at least one parameter) for those real objects or their portions that would highly likely be visible from the perspective of the given viewpoint, as discussed later. It will be appreciated that processing resources and processing time of the at least one processor that are saved by not reading (and not processing) the pixel data from the at least one region of the photo-sensitive surface, can instead be effectively employed for controlling the at least one parameter for performing the image signal processing on the pixel data that is read out from the remaining region. This may beneficially facilitate in capturing the image (and subsequently generating the XR image) in highly realistic and more accurate manner, without even overburdening, delays, and excessive power consumption of the at least one processor.

It will also be appreciated that the at least one parameter could, for example, be an optical focus of the camera, an exposure time of the camera, a sensitivity of the camera, an aperture size of the camera, white balance setting, and the like. There will now be discussed each aforementioned basis of controlling the at least one parameter in detail.

Optionally, when capturing the image by controlling the at least one parameter at (ii), the at least one processor is configured to adjust autofocus, based on the optical depths in the remaining portion of the field of view from the perspective of the given viewpoint. In this regard, since real objects or their portions that lie within the remaining portion of the field of view (namely, a non-occluded portion of the field of view) would be visible in the image, there may be some real objects that are considerably closer to the given viewpoint (i.e., optical depths of such real objects may be considerably less with respect to the given viewpoint) and a user of the at least one display apparatus likely to focus on such real objects, for example, as these real objects would be represented significantly bigger in size in the captured image. In such a case, the at least one processor adjusts the autofocus (of the camera) according to optical depths of such real objects, in order to capture (said real objects in) the image sharply (i.e., in-focus) and clearly. This improves user's viewing experience within the XR environment when the XR image is shown to the user. Optionally, the at least one processor is configured to adjust the autofocus, further based on a gaze direction of a user. Such a gaze-based autofocus beneficially facilitate in improving the user's viewing experience, as it can be ensured that a region of interest (i.e., a gaze area) in XR image is always in focus. It will be appreciated that the gaze direction of the user could be easily obtained from gaze-tracking means of the at least one display apparatus. The gaze-tracking means are well-known in the art.

Alternatively or additionally, optionally, when capturing the image by controlling the at least one parameter at (ii), the at least one processor is configured to adjust at least one of: exposure time, sensitivity, aperture size, based on the saturation of the pixels in the image segment of the previously-captured image that corresponds to the remaining portion of the field of view. In this regard, greater the saturation of the pixels in the image segment of the previously-captured image, greater is the loss of visual details in said image segment, and greater is the probability of potential saturation of pixels in a corresponding image segment of the image being captured by the image sensor. In order to mitigate such a probability and potential loss of visual details in the captured image, the at least one processor adjusts (namely, increases or decrease) at least one of: the exposure time, the sensitivity, the aperture size, accordingly, in a manner that the captured image has minimal/no saturation of pixels. The saturation of a given pixel in a given image occurs when one or more colour channels (such as RGB channels) of the given pixel reach a maximum colour intensity value (for example, a maximum colour intensity value of '255' for an 8-bit image), and then the one or more colour channels are said to be saturated, resulting in a loss of visual detail for the given pixel. Pixel saturation is well-known in the art.

It will be appreciated that for reducing the saturation of the pixels, the at least one processor is configured to decrease the exposure time (i.e., employing a faster shutter speed). This may, for example, be beneficial in a scenario where the image segment of the previously-captured image is overexposed (namely, too much bright). Thus, a shorter exposure time allows less light to hit the image sensor, which could prevent the one or more colour channels from reaching their respective maximum intensities. This is particularly useful for preventing highlights in an image from being saturated. Furthermore, the at least one processor is configured to decrease the sensitivity (i.e., ISO setting) for reducing potential pixel saturation. This may, for example, be beneficial in a scenario of overexposures. Thus, lowering the ISO decreases the image sensor's sensitivity to the light i.e., the image sensor requires a greater amount of the light to achieve a same exposure. This could prevent the pixel saturation by decreasing an overall brightness of the image being captured. Moreover, adjusting the aperture size could impact the pixel saturation in a different manner, for example, when an image is too bright (and leading to saturation), reducing the aperture size (namely, employing a higher F-number) facilitates in reducing the amount of light entering the camera, which could facilitate in decreasing the pixel saturation. On the other hand, increasing the aperture size (namely, employing a lesser F-number) facilitates in increasing the amount of light entering the camera, and thus could be helpful in low-light situations to avoid underexposure and to decrease the pixel saturation.

The term "exposure time" refers to a time span for which the photo-sensitive surface of the image sensor is exposed to light, so as to capture an image of the real-world environment. The term "sensitivity" refers to a measure of how strongly the photo-sensitive surface of the image sensor responds when exposed to the light, so as to capture an image of the real-world environment. Greater the sensitivity of the image sensor, lesser is the amount of light required to capture the image, and vice versa. Typically, the sensitivity of the given camera is expressed in terms of ISO levels, for example, such as lying in a range of ISO 100 to ISO 6400. The term "aperture size" refers to a size of an opening present in the camera through which the light emanating from the real-world environment enters the camera, and reaches the photo-sensitive surface. Typically, the aperture size of the given camera is expressed in an F-number format. Larger the aperture size, smaller is the F-number used for capturing images, and narrower is the depth-of-field captured in the images. Conversely, smaller the aperture size, greater is the F-number used for capturing images, and wider is the depth-of-field captured in the images. The F-number could, for example, be F/1.0, F/1.2, F/1.4, F/2.0, F/2.8, F/4.0, F/5.6, F/8.0, F/11.0, F/16.0, F/22.0, F/32.0, and the like. The exposure time, the sensitivity, and the aperture size are well-known in art.

It will also be appreciated that the previously-captured image may correspond to a different viewpoint as compared to the given viewpoint; therefore, the previously-captured image needs to be reprojected accordingly, in order to match a perspective of the different viewpoint with the perspective of the given viewpoint, for the at least one processor to determine the image segment of the previously-captured image that corresponds to the remaining portion of the field of view. Reprojection techniques and/or algorithms are well-known in the art.

Yet alternatively or additionally, optionally, when capturing the image by controlling the at least one parameter at (ii), the at least one processor is configured to adjust white balance, based on the colour temperature of the pixels in the image segment of the previously-captured image that corresponds to the remaining portion of the field of view. In this regard, adjusting (namely, increasing or decreasing) the white balance when capturing the image is directly related to the colour temperature, based to a given lighting condition of the real-world environment captured in the image. The term "colour temperature" refers to a perceived warmth or coolness of light in a scene of the real-world environment, and is expressed in terms of Kelvin (K). It will be appreciated that adjusting the white balance based on the colour temperature of the pixels in the image segment of the previously-captured image beneficially facilitates in achieving an accurate, consistent, visually pleasing colour reproduction in the captured image. In an example, the at least one processor may adjust the white balance using presets for example, such as daylight (having a range of colour temperature from 5500 K to 6500 K) for matching natural light, tungsten (having a range of colour temperature from 2800 K to 3200 K) for matching warm indoor lighting, cloudy (having a range of colour temperature from 6000 K to 7500 K) for matching warming cool lighting, and the like.

Generation of XR Image

Optionally, when utilising the VR image and the captured image, the at least one processor is configured to digitally superimpose the set of virtual objects that are represented in the VR image onto the captured image, to generate the XR image. In other words, the captured image gets digitally modified when the set of virtual objects is overlaid thereupon. Thus, the generated XR image would represent a view of the XR environment (in which the virtual objects of the set and real objects are visible) from the perspective of the given viewpoint. It will be appreciated that the at least one processor may utilise at least one image processing algorithm for generating the XR image in the aforesaid manner. Image processing algorithms for generating XR images are well-known in the art. Upon generating the XR image, the at least one processor is optionally configured to display the XR image, for example, via a light source per eye of the at least one display apparatus. Optionally, a given light source is implemented as a display or a projector. Displays and projectors are well-known in the art. The given light source may be a single-resolution light source or a multi-resolution light source.

The present disclosure also relates to the method as described above. Various embodiments and variants disclosed above, with respect to the aforementioned display apparatus of the third aspect, apply mutatis mutandis to the method of the fourth aspect.

Optionally, in the method, the step of capturing the image by controlling the at least one parameter at (ii) further comprises adjusting autofocus, based on the optical depths in the remaining portion of the field of view from the perspective of the given viewpoint.

Alternatively or additionally, optionally, in the method, the step of capturing the image by controlling the at least one parameter at (ii) further comprises adjusting at least one of: exposure time, sensitivity, aperture size, based on the saturation of the pixels in the image segment of the previously-captured image that corresponds to the remaining portion of the field of view.

Yet alternatively or additionally, optionally, in the method, the step of capturing the image by controlling the at least one parameter at (ii) further comprises adjusting white balance, based on the colour temperature of the pixels in the image segment of the previously-captured image that corresponds to the remaining portion of the field of view.

DETAILED DESCRIPTION OF THE DRAWINGS

Referring to FIG. 1, illustrated is a block diagram of an architecture of a system 100 incorporating image signal processing based on occlusion culling, in accordance with an embodiment of the present disclosure. The system 100 comprises at least one data repository (depicted as a data repository 102) and at least one server (depicted as a server 104). The server 104 is communicably coupled to the data repository 102, and to at least one display apparatus (depicted as a display apparatus 106). The server 104 is configured to perform various operations, as described earlier with respect to the aforementioned first aspect and/or the aforementioned second aspect.

It may be understood by a person skilled in the art that the FIG. 1 includes a simplified architecture of the system 100 for sake of clarity, which should not unduly limit the scope of the claims herein. It is to be understood that the specific implementations of the system 100 are provided as examples and are not to be construed as limiting it to specific numbers or types of data repositories, servers, and display apparatuses. The person skilled in the art will recognize many variations, alternatives, and modifications of embodiments of the present disclosure. For example, the server 104 may be communicably coupled to a plurality of display apparatuses.

Figure 2:
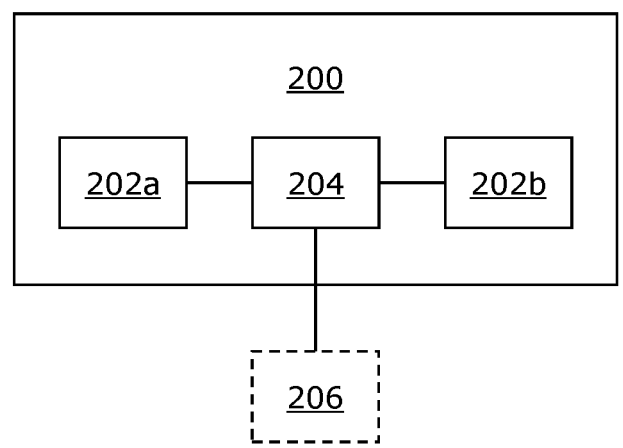
FIG. 2 illustrates a block diagram of an architecture of a display apparatus incorporating image signal processing based on occlusion culling, in accordance with an embodiment of the present disclosure.

Referring to FIG. 2, illustrated is a block diagram of an architecture of a display apparatus 200 incorporating image signal processing based on occlusion culling, in accordance with an embodiment of the present disclosure. The display apparatus 200 comprises an image sensor per eye (depicted as image sensors 202*a* and 202*b* for a left eye and a right eye, respectively) and at least one processor (depicted as a processor 204). The processor 204 is communicably coupled to the image sensors 202*a-b*, and to at least one server (depicted as a server 206). The processor 204 is configured to perform various operations, as described earlier with respect to the aforementioned third aspect.

It may be understood by a person skilled in the art that the FIG. 2 includes a simplified architecture of the display apparatus 200 for sake of clarity, which should not unduly limit the scope of the claims herein. It is to be understood that the specific implementations of the display apparatus 200 are provided as examples and are not to be construed as limiting it to specific numbers or types of image sensors, processors, and servers. The person skilled in the art will recognize many variations, alternatives, and modifications of embodiments of the present disclosure.

Figure 3:
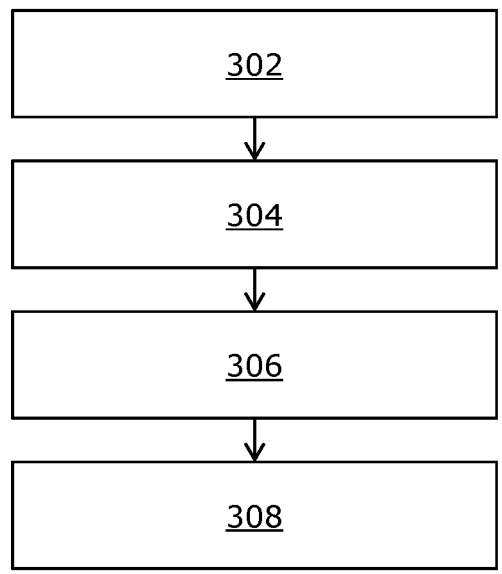
FIG. 3 illustrates steps of a method incorporating image signal processing based on occlusion culling, in accordance with an embodiment of the present disclosure.

Referring to FIG. 3, illustrated are steps of a method incorporating image signal processing based on occlusion culling, in accordance with an embodiment of the present disclosure. At step 302, a virtual-reality (VR) image representing a set of virtual objects and information indicative of at least one of: (a) at least one portion of a field of view of an image sensor that corresponds to at least one real object that is being occluded by the set of virtual objects in an extended-reality (XR) environment from a perspective of a given viewpoint, (b) one or more of a plurality of tiles of a real-world depth map whose three-dimensional (3D) bounding volumes are being fully occluded by the set of virtual objects from the perspective of the given viewpoint, are received from at least one server, wherein the image sensor comprises a plurality of pixels arranged on a photo-sensitive surface thereof, the image sensor being employed to capture images of a real-world environment. At step 304, at least one region of the photo-sensitive surface that corresponds to the at least one of: (a) the at least one portion of the field of view of the image sensor, (b) the one or more of the plurality of tiles of the real-world depth map, is determined by at least one processor. At step 306, an image is captured using the image sensor, by performing at least one of: (i) skipping read out of pixel data from the at least one region of the photo-sensitive surface, (ii) controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image. At step 308, the VR image and the captured image are utilising at the at least one processor, to generate an XR image.

The aforementioned steps are only illustrative and other alternatives can also be provided where one or more steps are added, one or more steps are removed, or one or more steps are provided in a different sequence without departing from the scope of the claims.

Figure 4:
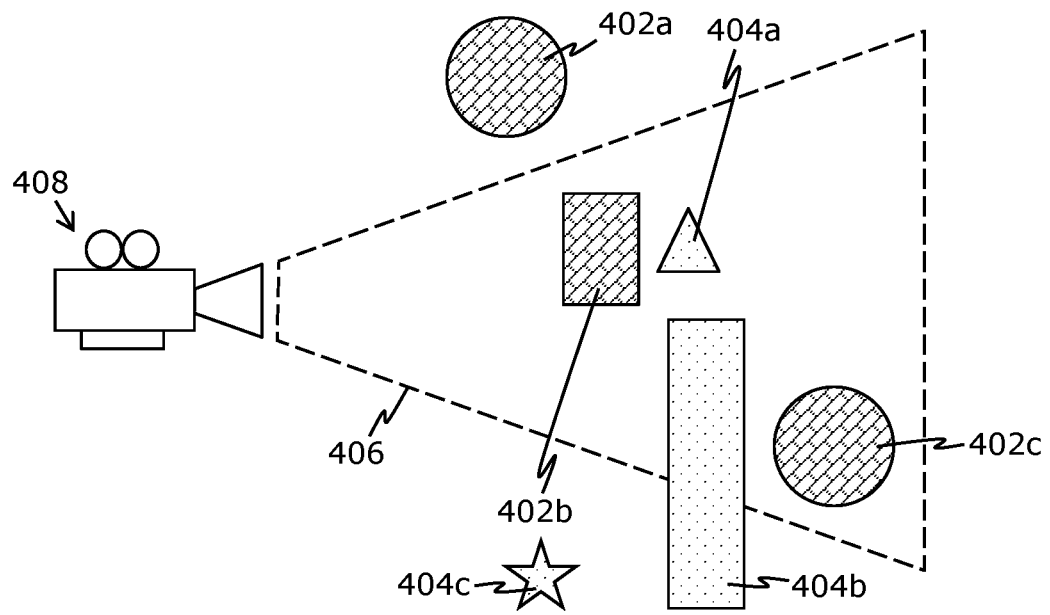
FIG. 4. illustrates a schematic illustration of how occlusion culling is performed using a combined three-dimensional (3D) model of an extended-reality (XR) environment, in accordance with an embodiment of the present disclosure.

Referring to FIG. 4, illustrated is a schematic illustration of how occlusion culling is performed using a combined three-dimensional (3D) model of an extended-reality (XR) environment, in accordance with an embodiment of the present disclosure. For sake of simplicity and better understanding, in FIG. 4, a top view of the XR environment is shown, and objects of simple shapes are shown within the XR environment. An XR scene of the XR environment comprises a plurality of real objects (depicted as real objects 402a, 402b, and 402c, using a diagonal brick pattern), and a plurality of virtual objects (depicted as virtual objects 404a, 404b and 404c, using a dotted pattern). As shown, from amongst the real objects 402a-c, the real objects 402b-c fully lie within a viewing frustum 406 (depicted using dashed lines) that is apexed at a given viewpoint of a camera 408 (namely, within a field of view of the camera 408). Additionally, from amongst the virtual objects 404a-c, the virtual object 404a fully lie within the viewing frustum 406, while the virtual object 404b partially lie within the viewing frustum 406. The real object 402a and the virtual object 404c do not lie within the viewing frustum 406. It is to be understood that the real objects 402a-c and the virtual objects 404a-c are present at different optical depths within the XR environment with respect to a given viewing position of the camera 408. From a perspective of the given viewpoint of the camera 408, the real object 402b (fully) occludes the virtual object 404a, and a portion of the virtual object 404b (fully) occludes the real object 402c in the XR environment. Therefore, only the real object 402b and a portion of the virtual object 404b are actually visible from the perspective of the given viewpoint of the camera 408.

FIG. 4 is merely an example, which should not unduly limit the scope of the claims herein. The person skilled in the art will recognize many variations, alternatives, and modifications of embodiments of the present disclosure.

Figure 5A:
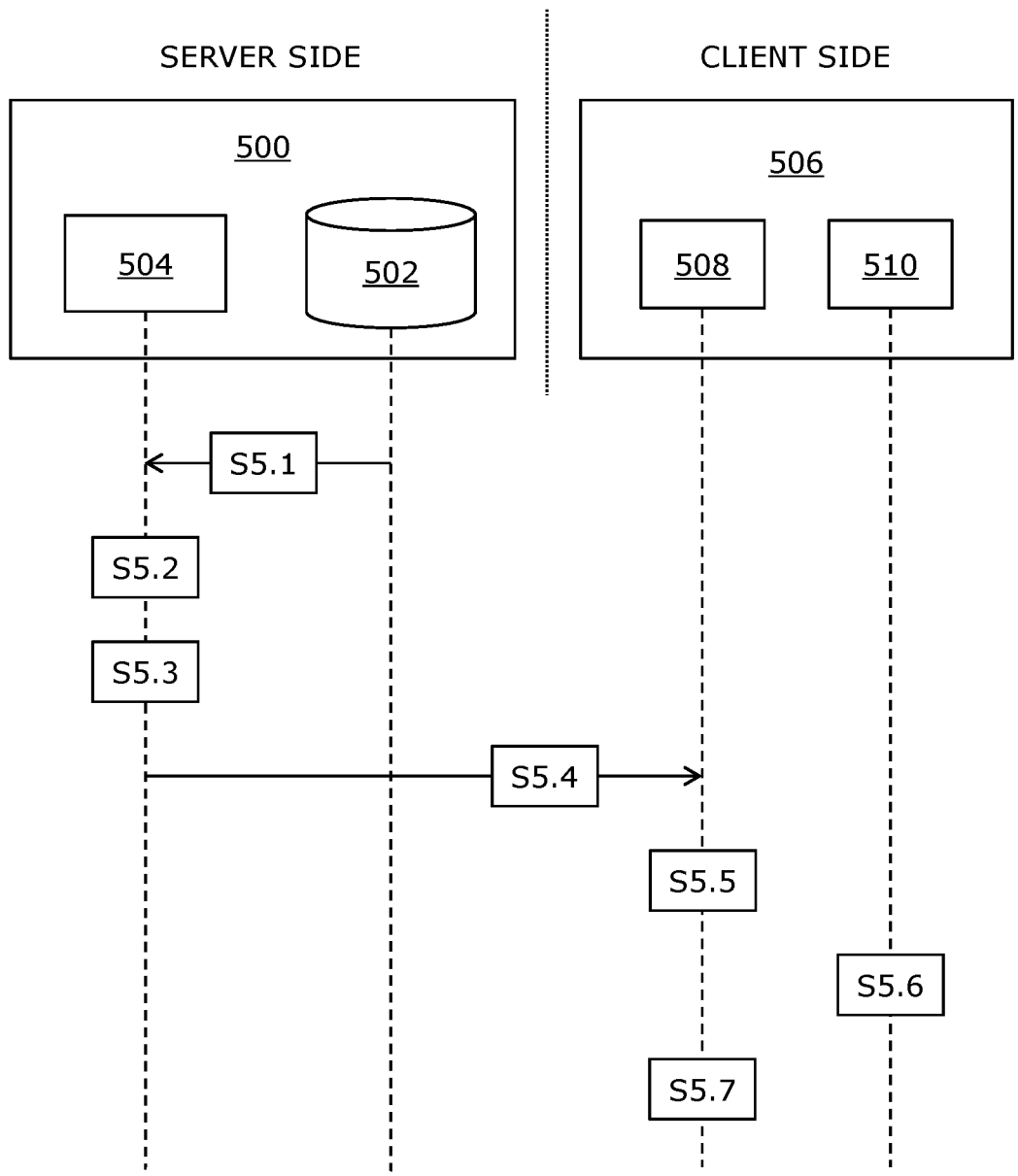
FIGS. 5A and 5B illustrate two different sequence diagrams of a data flow in a system incorporating image signal processing based on occlusion culling, in accordance with different embodiments of the present disclosure.
Figure 5B:
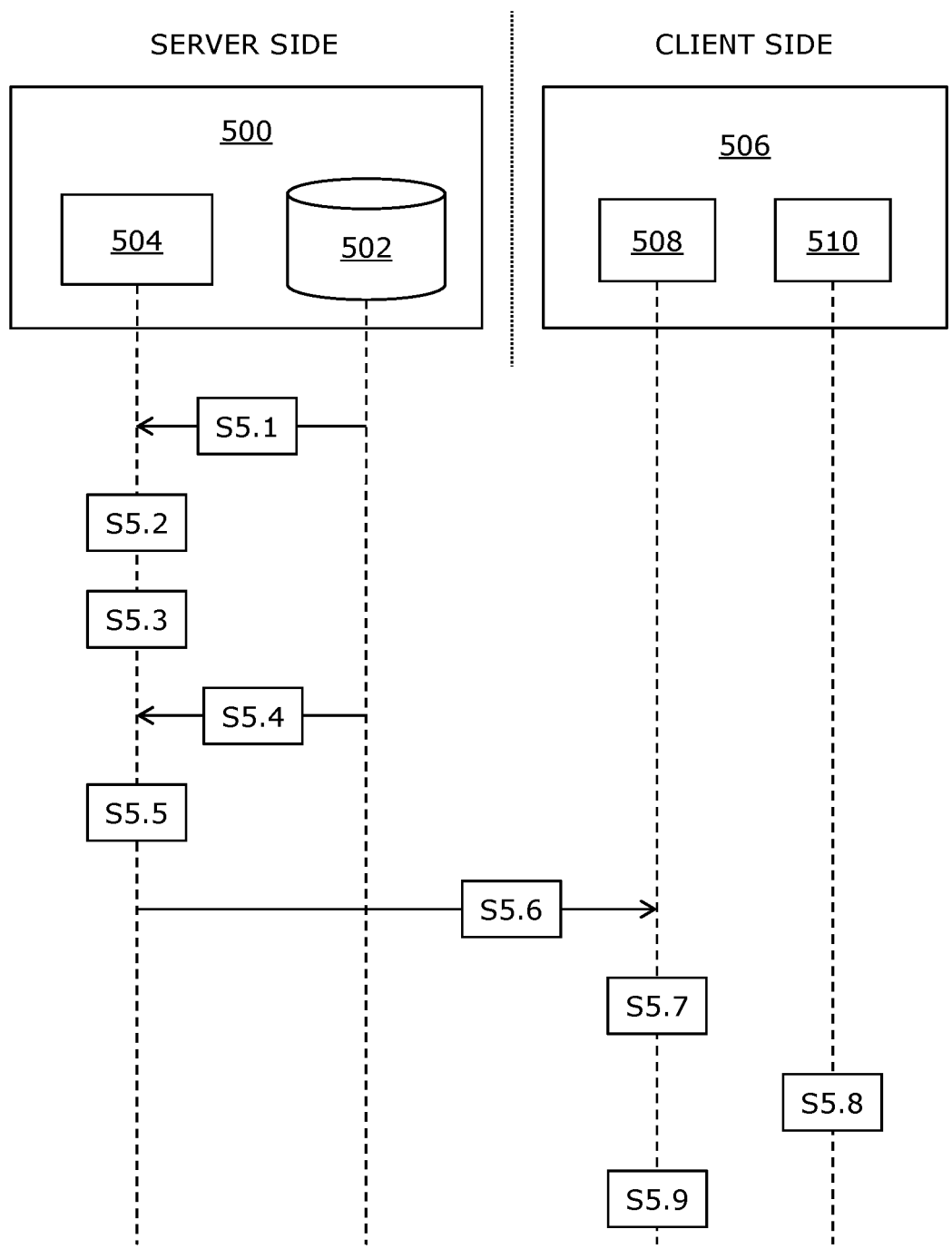

Referring to FIGS. 5A and 5B, illustrated are two different sequence diagrams of a data flow in a system 500 incorporating image signal processing based on occlusion culling, in accordance with different embodiments of the present disclosure. With reference to FIGS. 5A and 5B, the system 500 comprises at least one data repository (depicted as a data repository 502) and at least one server (depicted as a server 504). The server 504 is communicably coupled to the data repository 502, and to at least one display apparatus (depicted as a display apparatus 506). The display apparatus 506 comprises at least one processor (depicted as a processor 508) and an image sensor 510.

With reference to FIG. 5A, at step S5.1, the server 504 accesses, from the data repository 502, a first three-dimensional (3D) model of a virtual environment and a second 3D model of a real-world environment. At step S5.2, the server 504 combines the first 3D model and the second 3D model to generate a combined 3D model of an extended-reality (XR) environment. At step S5.3, the server 504 performs occlusion culling using the combined 3D model, to identify a set of virtual objects that occlude at least one real object in the XR environment from a perspective of a given viewpoint. At step S5.4, the server 504 sends, to (the processor 508 of) the display apparatus 506, a virtual-reality (VR) image representing the set of virtual objects and information indicative of at least one portion of a field of view that corresponds to the at least one real object that is being occluded by the set of virtual objects from the perspective of the given viewpoint. Upon receiving said VR image and said information at the processor 508, at step S5.5, the processor 508 determines at least one region of the photo-sensitive surface that corresponds to the at least one portion of the field of view of the image sensor. At step S5.6, the image sensor 510 is controlled, by the processor 508, to capture an image by skipping read out of pixel data from the at least one region of the photo-sensitive surface. At step S5.6, the processor 508 utilises the VR image and the captured image, to generate an XR image.

With reference to FIG. 5B, at step S5.1, the server 504 obtains, for example, from the data repository 502, a real-world depth map of a real-world environment from a perspective of a given viewpoint. At step S5.2, the server 504 divides the real-world depth map into a plurality of tiles. At step S5.3, for a given tile, the server 504 determines a three-dimensional (3D) bounding volume comprising non-empty 3D points. At step S5.4, the server 504 accesses, from the data repository 502, a 3D model of a virtual environment. At step S5.5, the server 504 performs occlusion culling on corresponding 3D bounding volumes of the plurality of tiles, by employing at least one of: the 3D model of the virtual environment, a virtual-reality (VR) depth map generated using the 3D model, to determine a set of virtual objects that occlude at least one real object in an extended-realty (XR) environment from a perspective of a given viewpoint and one or more of the plurality of tiles whose 3D bounding volumes are being fully occluded by the set of virtual objects from the perspective of the given viewpoint. At step S5.6, the server 504 sends, to (the processor 508) of the display apparatus 506, a VR image representing the set of virtual objects and information indicative of the one or more of the plurality of tiles whose 3D bounding volumes are being fully occluded by the set of virtual objects from the perspective of the given viewpoint. Upon receiving said VR image and said information at the processor 508, at step S5.7, the processor 508 determines at least one region of the photo-sensitive surface that corresponds to the one or more of the plurality of tiles of the real-world depth map. At step S5.8, the image sensor 510 is controlled, by the processor 508, to capture an image by controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image. At step S5.9, the processor 508 utilises the VR image and the captured image, to generate an XR image.

FIGS. 5A and 5B illustrate simplified sequence diagrams of the data flow in the system 500, for sake of clarity, which should not unduly limit the scope of the claims herein. The person skilled in the art will recognize many variations, alternatives, and modifications of embodiments of the present disclosure.

The invention claimed is:

1. A system comprising at least one data repository and at least one server configured to:
   obtain a real-world depth map of a real-world environment from a perspective of a given viewpoint;
   divide the real-world depth map into a plurality of tiles;
   for a given tile, determine a three-dimensional (3D) bounding volume comprising non-empty 3D points;
   access, from the at least one data repository, a 3D model of a virtual environment;
   perform occlusion culling on corresponding 3D bounding volumes of the plurality of tiles, by employing at least one of: the 3D model of the virtual environment, a virtual-reality (VR) depth map generated using the 3D model, to determine a set of virtual objects that occlude at least one real object in an extended-realty (XR) environment from a perspective of a given viewpoint and one or more of the plurality of tiles whose 3D bounding volumes are being fully occluded by the set of virtual objects from the perspective of the given viewpoint; and send, to at least one display apparatus, a VR image representing the set of virtual objects and information indicative of the one or more of the plurality of tiles whose 3D bounding volumes are being fully occluded by the set of virtual objects from the perspective of the given viewpoint.

2. The system of claim 1, wherein said information is sent to the at least one display apparatus prior to sending the VR image.

3. A display apparatus comprising:

an image sensor per eye, comprising a plurality of pixels arranged on a photo-sensitive surface thereof, the image sensor being employed to capture images of a real-world environment; and at least one processor configured to:

receive, from at least one server, a virtual-reality (VR) image representing a set of virtual objects and information indicative of at least one of:

(a) at least one portion of a field of view of the image sensor that corresponds to at least one real object that is being occluded by the set of virtual objects in an extended-reality (XR) environment from a perspective of a given viewpoint, (b) one or more of a plurality of tiles of a real-world depth map whose three-dimensional (3D) bounding volumes are being fully occluded by the set of virtual objects from the perspective of the given viewpoint;

determine at least one region of the photo-sensitive surface that corresponds to the at least one of:

(a) the at least one portion of the field of view of the image sensor, (b) the one or more of the plurality of tiles of the real-world depth map;

capture an image using the image sensor, by performing at least one of:

(i) skipping read out of pixel data from the at least one region of the photo-sensitive surface, (ii) controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image; and utilise the VR image and the captured image, to generate an XR image.

4. The display apparatus of claim 3, wherein when capturing the image by controlling the at least one parameter at (ii), the at least one processor is configured to adjust autofocus, based on the optical depths in the remaining portion of the field of view from the perspective of the given viewpoint.

5. The display apparatus of claim 3, wherein when capturing the image by controlling the at least one parameter at (ii), the at least one processor is configured to adjust at least one of: exposure time, sensitivity, aperture size, based on the saturation of the pixels in the image segment of the previously-captured image that corresponds to the remaining portion of the field of view.

6. The display apparatus of claim 3, wherein when capturing the image by controlling the at least one parameter at (ii), the at least one processor is configured to adjust white balance, based on the colour temperature of the pixels in the image segment of the previously-captured image that corresponds to the remaining portion of the field of view.

7. A method comprising:

receiving, from at least one server, a virtual-reality (VR) image representing a set of virtual objects and information indicative of at least one of:

(a) at least one portion of a field of view of an image sensor that corresponds to at least one real object that is being occluded by the set of virtual objects in an extended-reality (XR) environment from a perspective of a given viewpoint, (b) one or more of a plurality of tiles of a real-world depth map whose three-dimensional (3D) bounding volumes are being fully occluded by the set of virtual objects from the perspective of the given viewpoint, wherein the image sensor comprises a plurality of pixels arranged on a photo-sensitive surface thereof, the image sensor being employed to capture images of a real-world environment;

determining, by at least one processor, at least one region of the photo-sensitive surface that corresponds to the at least one of:

(a) the at least one portion of the field of view of the image sensor, (b) the one or more of the plurality of tiles of the real-world depth map;

capturing an image using the image sensor, by performing at least one of:

(i) skipping read out of pixel data from the at least one region of the photo-sensitive surface, (ii) controlling at least one parameter employed for performing image signal processing on pixel data read out from a remaining region of the photo-sensitive surface, based on at least one of: optical depths in a remaining portion of the field of view from the perspective of the given viewpoint, a saturation of pixels in an image segment of a previously-captured image that corresponds to the remaining portion of the field of view, a colour temperature of the pixels in the image segment of the previously-captured image; and utilising, at the at least one processor, the VR image and the captured image, to generate an XR image.

8. The method of claim 7, wherein the step of capturing the image by controlling the at least one parameter at (ii) further comprises adjusting autofocus, based on the optical depths in the remaining portion of the field of view from the perspective of the given viewpoint.

9. The method of claim 7, wherein the step of capturing the image by controlling the at least one parameter at (ii) further comprises adjusting at least one of: exposure time, sensitivity, aperture size, based on the saturation of the pixels in the image segment of the previously-captured image that corresponds to the remaining portion of the field of view.

10. The method of claim 7, wherein the step of capturing the image by controlling the at least one parameter at (ii) further comprises adjusting white balance, based on the colour temperature of the pixels in the image segment of the previously-captured image that corresponds to the remaining portion of the field of view.

* * * * *